United States Patent
Petrick et al.

(10) Patent No.: US 7,683,322 B2
(45) Date of Patent: Mar. 23, 2010

(54) SYSTEMS, METHODS AND APPARATUS FOR NON-VOLATILE STORAGE OF HEALTHCARE IMAGE DATA

(75) Inventors: Scott William Petrick, Sussex, WI (US); Jacob Robert Bauer, Greenfield, WI (US); Zeljko John Serceki, Hartland, WI (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 11/554,888

(22) Filed: Oct. 31, 2006

(65) Prior Publication Data

US 2008/0099680 A1    May 1, 2008

(51) Int. Cl.
*G01J 1/00*    (2006.01)
(52) U.S. Cl. .................................................. 250/336.1
(58) Field of Classification Search ............... 250/336.1, 250/580; 378/102
See application file for complete search history.

(56) References Cited

U.S. PATENT DOCUMENTS

| | | | |
|---|---|---|---|
| 2004/0186746 A1* | 9/2004 | Angst et al. ..................... 705/3 |
| 2005/0078195 A1* | 4/2005 | VanWagner .............. 348/231.3 |
| 2006/0082730 A1* | 4/2006 | Franks ......................... 352/95 |
| 2006/0261296 A1* | 11/2006 | Heath et al. .................. 250/580 |
| 2007/0010986 A1* | 1/2007 | Hong et al. .................... 703/24 |
| 2007/0078678 A1* | 4/2007 | DiSilvestro et al. ............ 705/2 |
| 2007/0143147 A1* | 6/2007 | Petrick et al. .................. 705/3 |

FOREIGN PATENT DOCUMENTS

JP        03108963 A  *  5/1991

* cited by examiner

*Primary Examiner*—David P Porta
*Assistant Examiner*—Kiho Kim
(74) *Attorney, Agent, or Firm*—Peter Vogel, Esq.; William Baxter, Esq.; Michael G. Smith, Esq.

(57) ABSTRACT

Systems, methods and apparatus are provided through which in some embodiments a non-volatile storage medium is or can be operably coupled to a medical image acquisition device to reduce the risk of loss of medical image data.

22 Claims, 16 Drawing Sheets

SYSTEMS, METHODS AND APPARATUS FOR NON-VOLATILE STORAGE OF HEALTHCARE IMAGE DATA

FIELD OF THE INVENTION

This invention relates generally to portable X-ray detectors, and more particularly to transmission of data to and from the portable X-ray detectors.

BACKGROUND OF THE INVENTION

Digital medical diagnostic imaging systems can be operably coupled to a portable X-ray detector through a wireless communication path and/or a wired communication path. Where the portable X-ray detector is operably coupled to a digital medical diagnostic imaging system through a wireless communication path, the portable X-ray detector is often referred to as a wireless portable X-ray detector.

A portable X-ray detector facilitates patient positioning with ease for the patient while also relieving the X-ray radiologist from wielding a cumbersome and heavy tether. However, one problem of a portable X-ray detector is the integrity of the image data that is stored in volatile memory. Portable X-ray detectors are conventionally powered by batteries. Batteries are used in order to improve portability of the portable X-ray detector. Batteries provide a limited amount of power, and eventually, the amount of power provided by a battery will decrease to a point beyond which the portable X-ray detector cannot function.

When the portable X-ray detector does not receive sufficient power from the batteries to function, quite often, the volatile memory loses image data stored in the volatile memory. If this power failure occurs before the image data has been completely and successfully transmitted to an external device, the data is lost or corrupted and the exposure must be retaken, meaning additional radiation to the patient. This also represents additional cost that is born by the facility that operates the portable X-ray detector.

For the reasons stated above, and for other reasons stated below which will become apparent to those skilled in the art upon reading and understanding the present specification, there is a need in the art to reduce the risk of exposing a medical patient to additional radiation in retaking an exposure after failure of the power supply and before the portable X-ray device or other device that captures medical images has completely and successfully transmitted the image data to an external device from the volatile storage medium of the portable X-ray detector. There is also a need in the art to eliminate the additional cost in retaking an exposure of the patient after failure of the power supply before the portable X-ray device has completely and successfully transmitted the image data to an external device from the volatile storage medium of the portable X-ray detector.

BRIEF DESCRIPTION OF THE INVENTION

The above-mentioned shortcomings, disadvantages and problems are addressed herein, which will be understood by reading and studying the following specification.

In one aspect, a wireless portable X-ray detector includes non-volatile memory. The non-volatile memory acts as a backup device to volatile memory in the wireless portable X-ray detector in the event that a power supply to the volatile memory of the wireless portable X-ray detector fails before the contents of the volatile memory are transferred to an external device, which reduces the risk of exposing a medical patient to additional X-ray radiation and can eliminate the risk of the additional cost in retaking an exposure of the patient after failure of power supply.

In another aspect, an apparatus to capture medical images includes a detector and a non-volatile storage device (e.g. flash memory) is operably coupled to the detector.

In yet another aspect, an apparatus to capture medical images includes a housing; a detector mounted in the housing; control electronics mounted in the housing and operably coupled to the detector, and an external connection point mounted on the housing and operably coupled to the electronics and operable to communicate data to an external device having non-volatile memory that can be operably coupled to the external connection point.

In still another aspect, a method performed by a portable X-ray detector includes transmitting the medical image data from volatile memory to an external device via a wireless communication path, and storing the medical image data to a non-volatile medium. The storing to non-volatile memory provides a backup copy of the medical image data in the event that a power supply to volatile memory fails before the contents of the volatile memory are transferred to an external device, which reduces the risk of exposing a medical patient to additional radiation and reduces risk of the additional cost in retaking the exposure after failure of the power supply.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, apparatus of embodiments are described. In the third section, embodiments of methods are described. In the fourth section, a hardware and the operating environment in conjunction with which embodiments may be practiced are described. Finally, in the fifth section, a conclusion of the detailed description is provided.

System Level Overview

Figure 1:
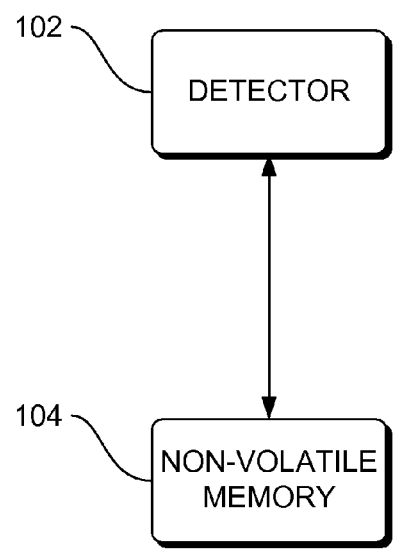
FIG. 1 is a block diagram of an overview of a system to reduce the risk of loss of medical image data in a portable X-ray detector.
Figure 1:

FIG. 1 is a block diagram of an overview of a system 100 to reduce the risk of loss of medical image data in a portable X-ray detector. System 100 solves the need in the art to reduce the risk of exposing a medical patient to additional radiation in retaking an exposure after failure of the power supply to a device that captures medical images before the device that captures medical images has completely and successfully transmitted the image data to an external device from a volatile storage medium of the device that captures medical images. System 100 solves the need in the art to the reduce the risk of additional cost in retaking an exposure after failure of the battery before the device that captures medical images has completely and successfully transmitted the image data to an external device from the volatile storage medium of the device that captures medical images.

System 100 includes a detector 102 and a non-volatile storage device 104 that is operably coupled to the detector. The detector 102 is also known as a detector module or detector element. The non-volatile storage device 104 receives and stores medical image data from the detector 102. The non-volatile storage device 104 does not need power to maintain the information stored in the non-volatile storage device 104.

The non-volatile storage device 104 provides a means to store image data without danger that is posed by loss of power source. The non-volatile storage device 104 acts as a substantially and relatively fail-safe backup for the image data. Thus, system 100 solves the need in the art to reduce the risk of exposing a medical patient to additional radiation and can eliminate the risk of additional cost in retaking an exposure after failure of power supply to system 100 before system 100 has completely and successfully transmitted the image data to an external device from a volatile storage medium of system 100.

While the system 100 is not limited to any particular detector 102 or non-volatile storage device 104, for sake of clarity a simplified detector 102 and non-volatile storage device 104 are described.

Apparatus Embodiments

In the previous section, a system level overview of the operation of an embodiment was described. In this section, the particular apparatus of such an embodiment are described by reference to a series of diagrams.

Figure 2:
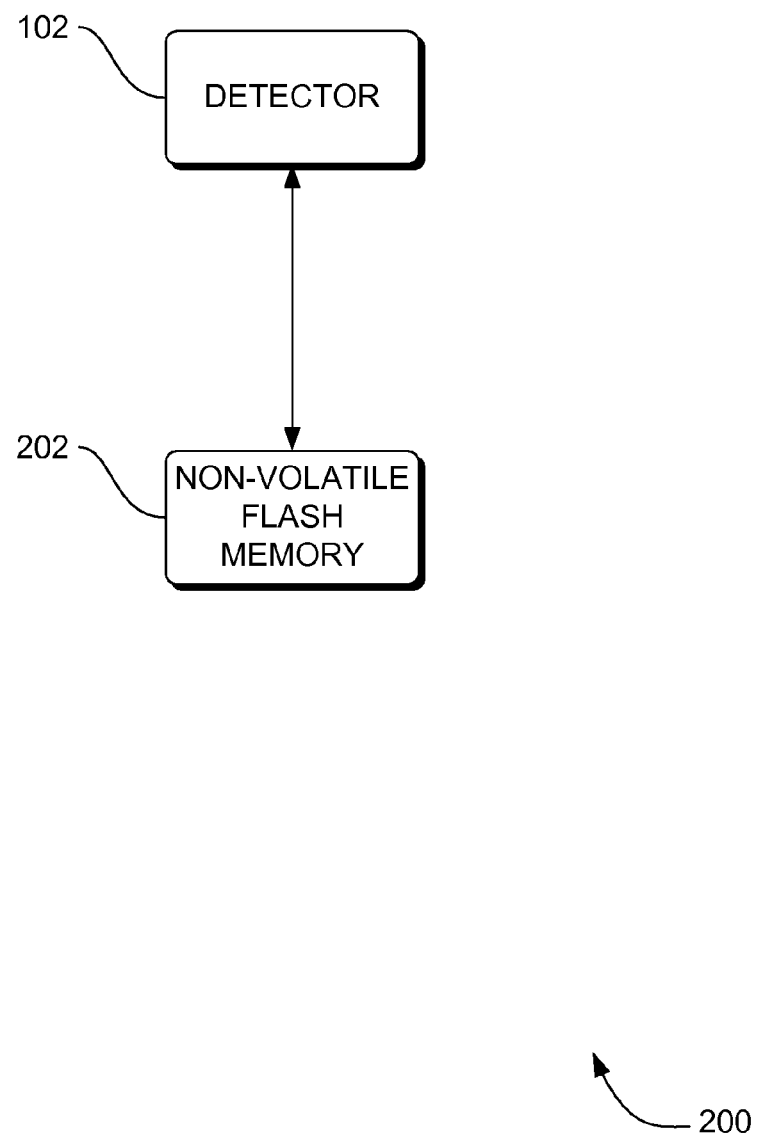
FIG. 2 is a block diagram of apparatus to capture medical images that includes a flash memory device, according to an embodiment.

FIG. 2 is a block diagram of apparatus 200 to capture medical images that includes a flash memory device, according to an embodiment. Apparatus 200 solves the need in the art to reduce the risk of exposing a medical patient to additional radiation and solves the need in the art to reduced the risk of additional cost in retaking an exposure after failure of power supply to a device that captures medical images before the device that captures medical images has completely transmitted the image data to an external device.

In apparatus 200, the non-volatile storage device 104 of FIG. 1 includes a flash memory device 202 that offers fast read access times, though not as fast as volatile DRAM memory used for main memory in PCs. The flash memory device 202 also provides better shock resistance than hard disks. Another benefit of the flash memory device 202 is that in embodiments that are packaged in a "memory card," the flash memory device 202 is nearly indestructible by physical means, being able to withstand intense pressure and boiling water. Manufacturers of flash memory devices 202 include Atmel Corp., Intel Corp., Micron Technology, Samsung, Sandisk, Sharp Corp., Spansion and Toshiba Corp, for example. Some embodiments of the flash memory device 202 include a mass storage controller.

The flash memory device 202 can be manufactured to a number of standards for form factor and/or communication protocol, such as CompactFlash (CF), Memory Stick, Memory Stick Duo, Memory Stick Pro, MultiMediaCard (MMC), Reduced-Size MultiMediaCard (RS-MMC), Multi-MediaCard Mobile (MMCmobile), MultiMediaCard Mini (MMCmini), MultiMediaCard Micro (MMCmicro), Secure Digital (SD), Mini Secure Digital (miniSD), Micro Secure Digital (microSD), xD-Picture Card, and SmartMedia (SM), for example.

The flash memory device 202 stores information in an array of floating gate transistors, called "cells", each of which traditionally stores one bit of information. Newer flash memory devices, sometimes referred to as multi-level cell devices, can store more than 1 bit per cell, by using more than two levels of electrical charge, placed on the floating gate of a cell. Implementations of the flash memory device 202 include NOR and NAND devices. Flash memory devices have a finite number of erase-write cycles. Most commercially available flash memory devices withstand 1 million programming cycles. In addition to the flash memory device 202, other embodiments of the non-volatile storage device 104 of FIG. 1, include a hard disk drive or magnetic RAM (MRAM).

Figure 3:
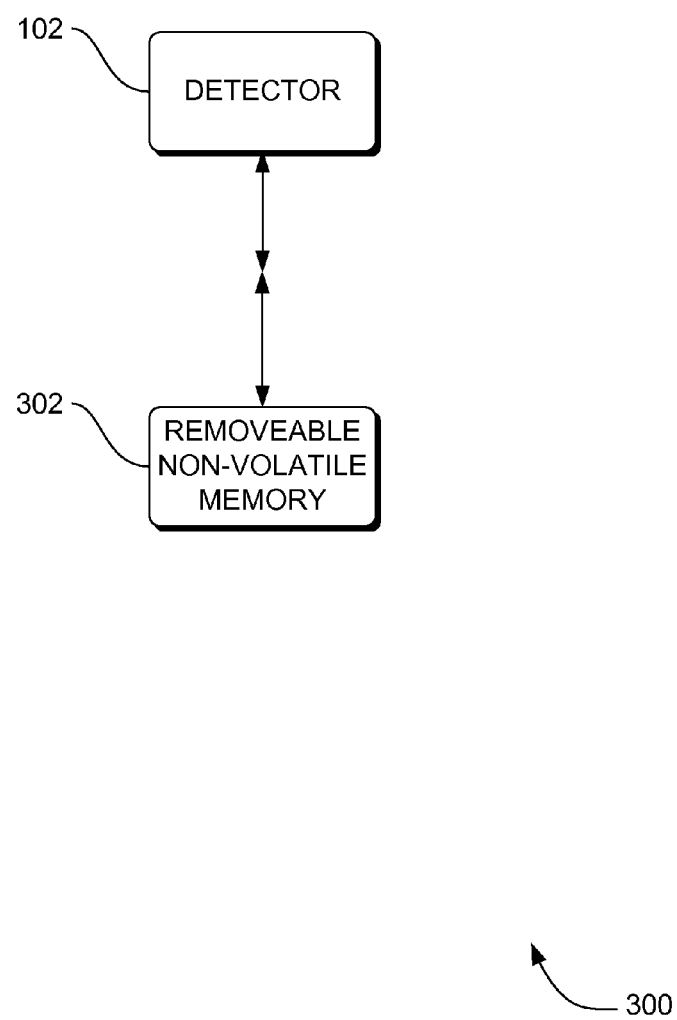
FIG. 3 is a block diagram of apparatus to capture medical images including a removable non-volatile storage device, according to an embodiment.

FIG. 3 is a block diagram of apparatus 300 to capture medical images including a removable non-volatile storage device, according to an embodiment. Apparatus 300 solves the need in the art to reduce the risk of exposing a medical patient to additional radiation and can eliminate the additional cost of retaking an exposure after failure of power supply to a device that captures medical images before the device that captures medical images has completely transmitted the image data to an external device.

In apparatus 300, a non-volatile storage device 302 is removable and operable to couple to the detector 102. The removable non-volatile storage device 302 provides the benefit of convenient maintenance by service technicians and also allows the removable non-volatile storage device 302 to be replaced when faster, more reliable and higher capacity non-volatile storage devices become available.

Figure 4:
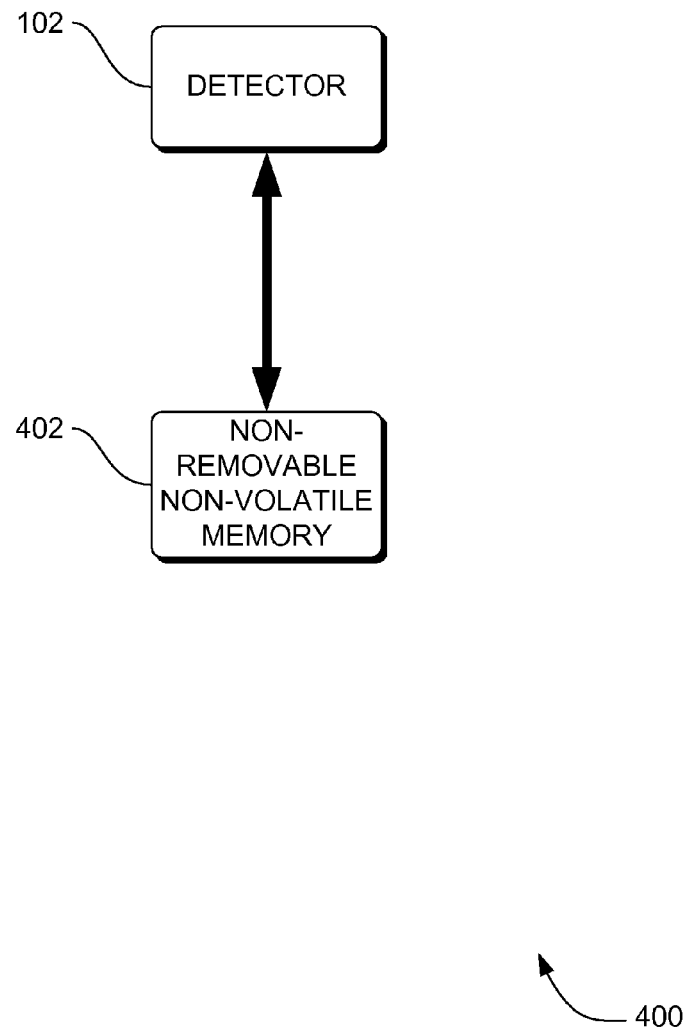
FIG. 4 is a block diagram of apparatus to capture medical images that includes a non-removable non-volatile storage device, according to an embodiment.

FIG. 4 is a block diagram of apparatus 400 to capture medical images that includes a non-removable non-volatile storage device, according to an embodiment. Apparatus 400 solves the need in the art to reduce the risk of exposing a medical patient to additional radiation and reduces the risk of additional cost of retaking an exposure after failure of power supply to a device that captures medical images before the device that captures medical images has completely transmitted the image data to an external device.

In apparatus 400, a non-volatile storage device 402 is non-removable and operably coupled to the detector 102. The non-removable non-volatile storage device 402 withstands shock vibration very well, and thus provides the benefit of requiring less frequent maintenance. In some embodiments, the non-removable non-volatile storage device 402 is fixed or permanently mounted to a portion of the apparatus 400, or soldered to a portion of the apparatus 400.

Figure 5:
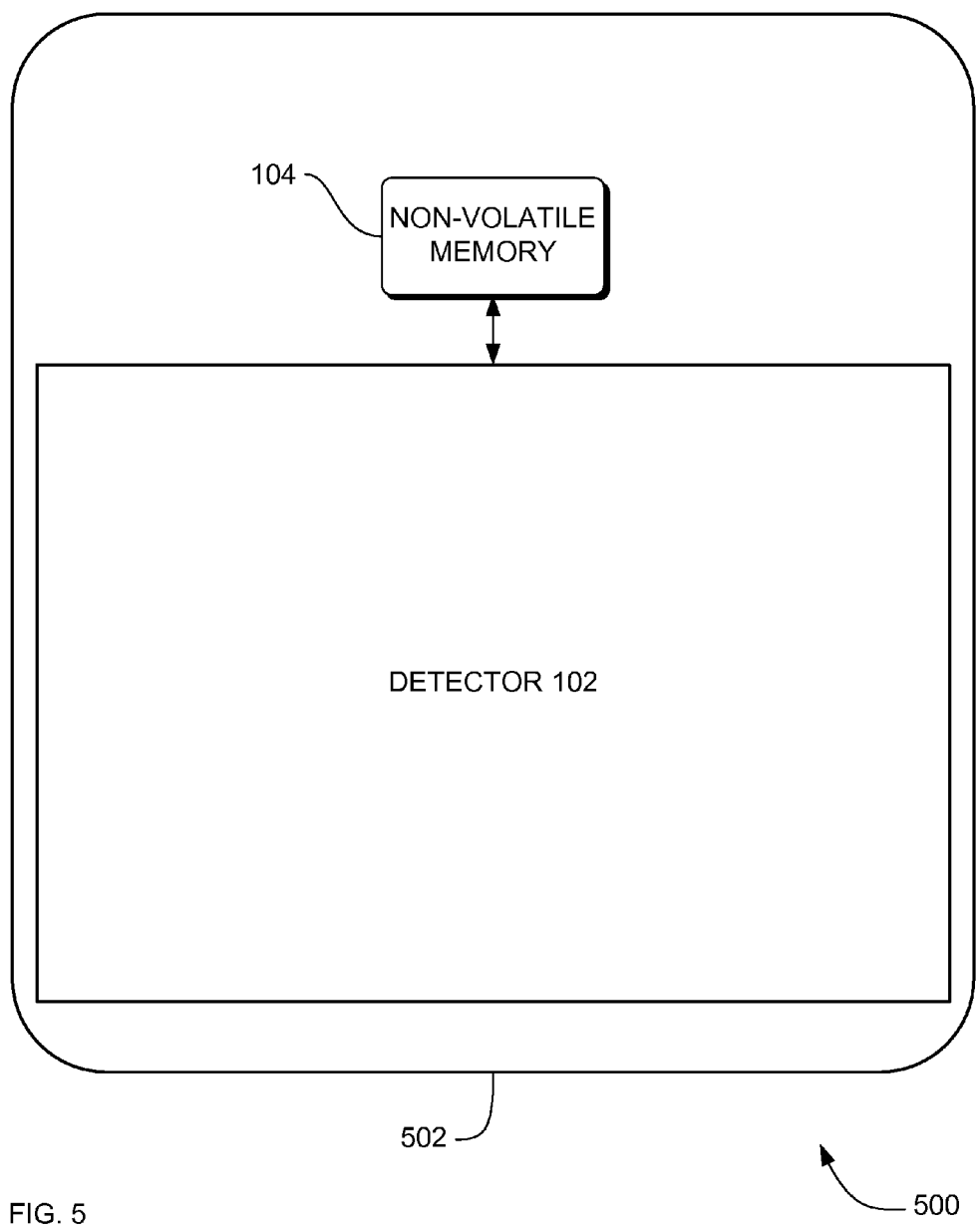
FIG. 5 is a block diagram of portable X-ray detector that includes a housing and a non-volatile storage device, according to an embodiment.

FIG. 5 is a block diagram of portable X-ray detector 500 that includes a housing and a non-volatile storage device, according to an embodiment. Apparatus 500 solves the need in the art to reduce the risk of exposing a medical patient to additional radiation and reduces the risk of additional cost of retaking an exposure after failure of power supply to a device that captures medical images before the device that captures medical images has completely transmitted the image data to an external device.

The portable X-ray detector 500 includes a housing 502 containing the detector 102 and the non-volatile storage device 104. The non-volatile storage device 104 provides a means to store image data without danger that is posed by loss of power source. The non-volatile storage device 104 acts as a substantially and relatively fail-safe backup for the image data. Thus, portable X-ray detector 500 solves the need in the art to reduce the risk of exposing a medical patient to additional radiation and solves the need in the art to reduce and/or eliminate the additional cost in retaking an exposure after failure of power supply to portable X-ray detector 500 before portable X-ray detector 500 has completely and successfully transmitted the image data to an external device from a volatile storage medium of portable X-ray detector 500.

Figure 6:
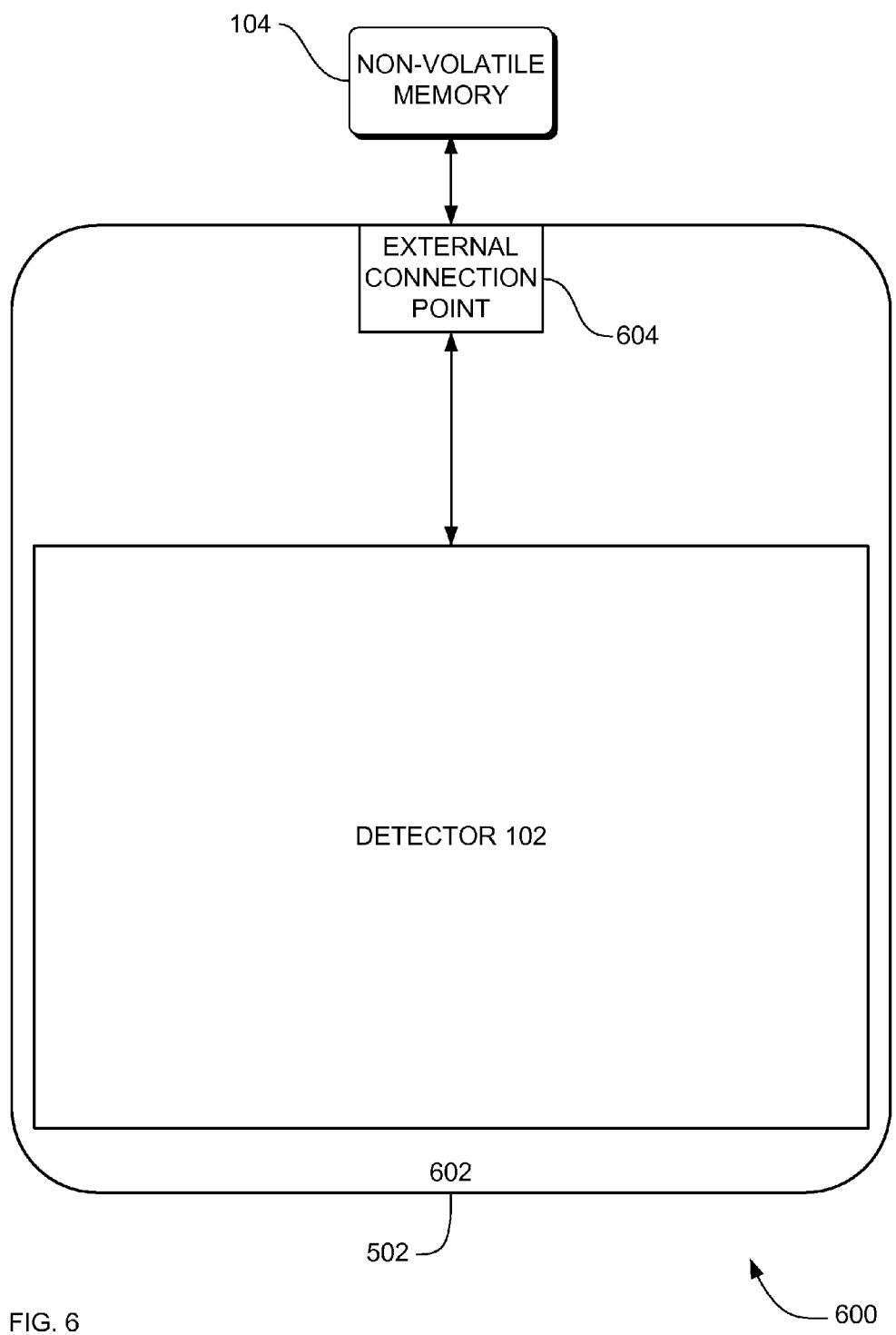
FIG. 6 is a block diagram of an apparatus that includes a portable X-ray detector operably coupled to an external non-volatile storage device, according to an embodiment.

FIG. 6 is a block diagram of an apparatus 600 that includes a portable X-ray detector 602 operably coupled to an external non-volatile storage device, according to an embodiment. Apparatus 600 solves the need in the art to reduce the risk of exposing a medical patient to additional radiation and can eliminate the additional cost in retaking an exposure after failure of power supply to a device that captures medical images before the device that captures medical images has completely transmitted the image data to an external device.

In apparatus 600, the non-volatile storage device 104 is external to the housing 502 of the portable X-ray detector 602. Portable X-ray detector 602 includes an external connection point 604 mounted to the housing 502. The size, position and shape of the external connection point 604 shown in FIG. 6 is not dispositive as other sizes, positions and shapes of external connection point 604 are possible.

The external connection point 604 is operably coupled to the non-volatile storage device 104. The external connection point 604 is operably coupled to the detector 102. The external connection point 604 is also operable to communicate data between the non-volatile storage device 104 and the detector 102.

Figure 7:
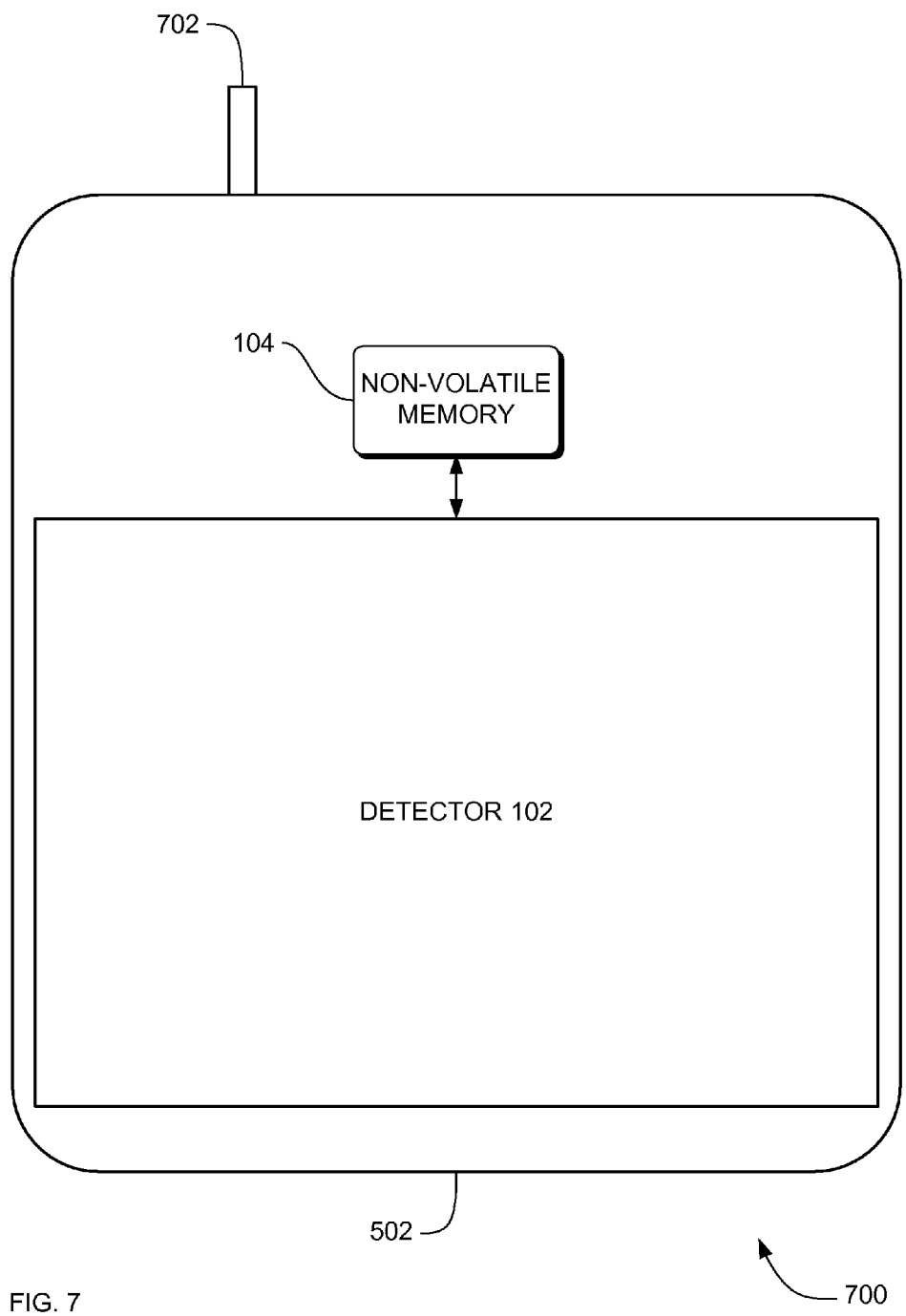
FIG. 7 is a block diagram of wireless portable X-ray detector having a non-volatile storage device, according to an embodiment.

FIG. 7 is a block diagram of a wireless portable X-ray detector 700 having a non-volatile storage device, according to an embodiment. Apparatus 700 solves the need in the art to reduce the risk of exposing a medical patient to additional radiation and the additional cost in retaking an exposure after failure of power supply to a device that captures medical images before the device that captures medical images has completely transmitted the image data to an external device.

The wireless portable X-ray detector 700 includes an antennae 702 that is used for communication with external devices. The size, position and shape of the antennae 702 shown in FIG. 7 is not dispositive, as other sizes, positions and shapes of the antennae 702 are possible.

Figure 8:
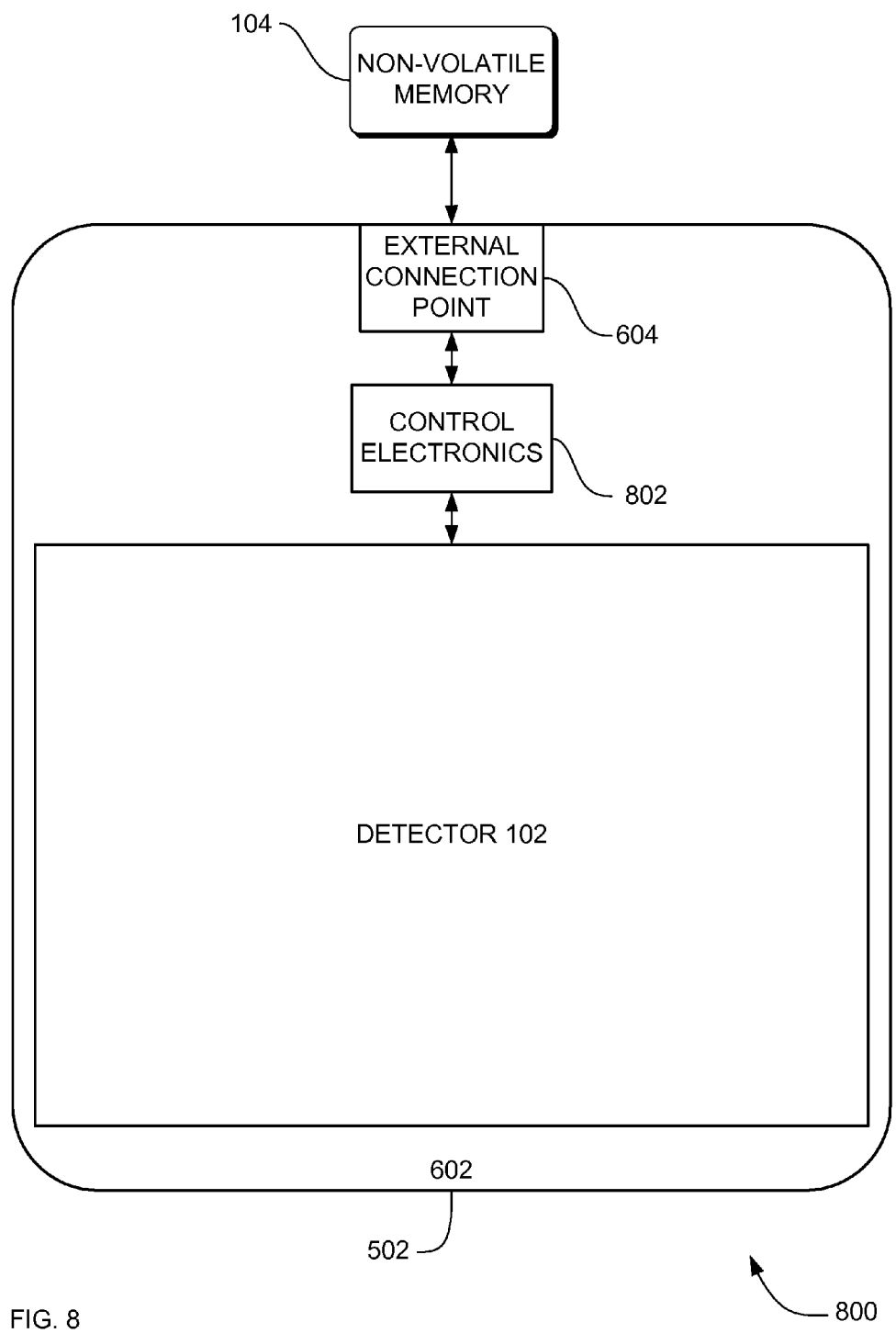
FIG. 8 is a block diagram of apparatus to capture medical images, according to an embodiment.

FIG. 8 is a block diagram of apparatus 800 to capture medical images, according to an embodiment. Apparatus 800 solves the need in the art to reduce the risk of exposing a medical patient to additional radiation and the additional cost in retaking an exposure after failure of power supply to a device that captures medical images before the device that captures medical images has completely transmitted the image data to an external device.

Apparatus 800 includes a portable X-ray detector 602 having a detector 102 mounted in the housing 502. Apparatus 800 also includes control electronics 802 that is mounted in the housing 502 of the portable X-ray detector 602. The control electronics 802 are operably coupled to the detector 102. Apparatus 800 also includes an external connection point 604 that is mounted on the housing 502 and operably coupled to the control electronics 802. The external connection point 604 is operable to communicate data to an external device having non-volatile memory in which the external device can be operably coupled to the external connection point 604.

Figure 9:
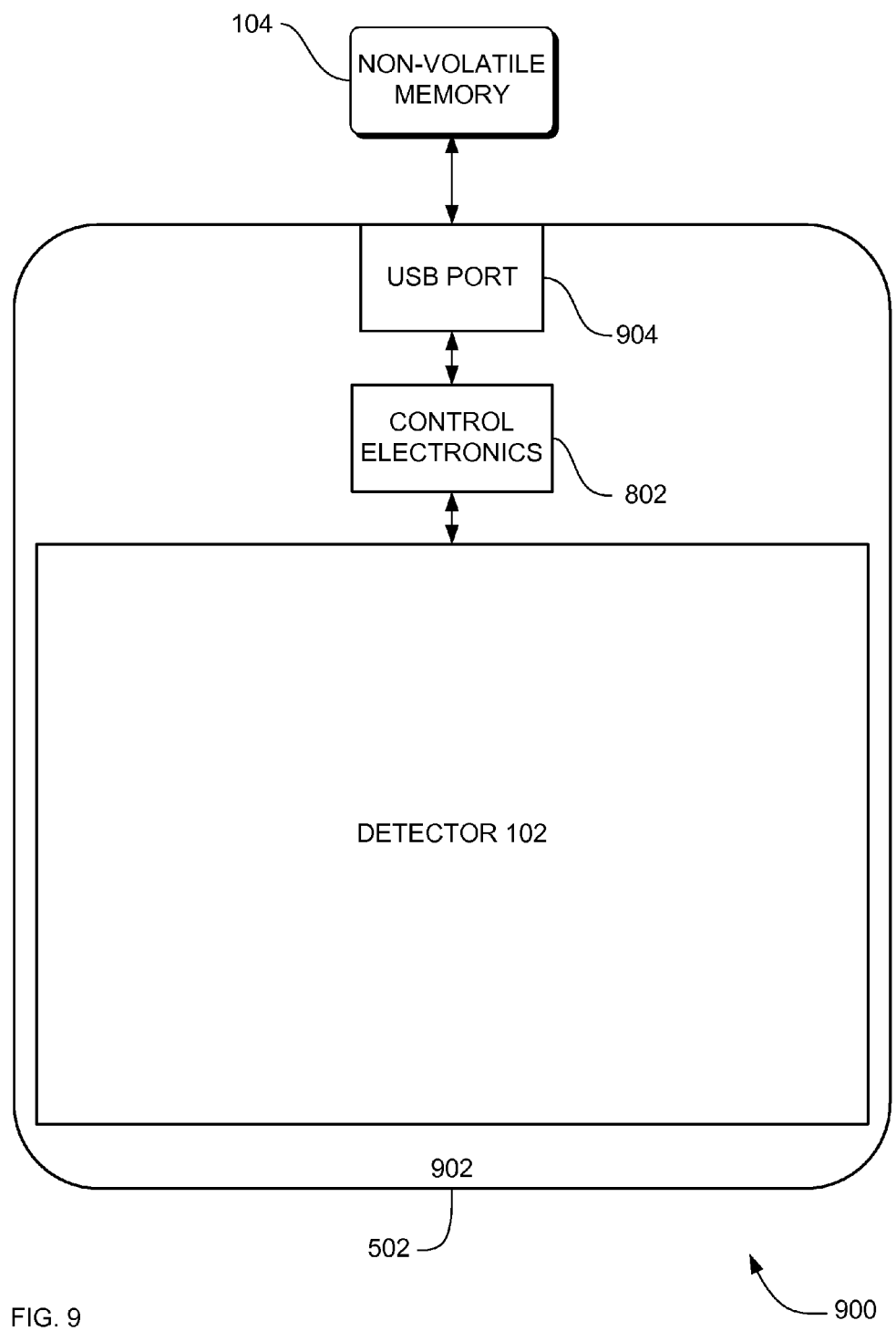
FIG. 9 is a block diagram of apparatus to capture medical images, including a USB port according to an embodiment.

FIG. 9 is a block diagram of apparatus 900 to capture medical images, including a USB port according to an embodiment. Apparatus 900 solves the need in the art to reduce the risk of exposing a medical patient to additional radiation and the additional cost in retaking an exposure after failure of power supply to a device that captures medical images before the device that captures medical images has completely transmitted the image data to an external device.

In apparatus 900, a portable X-ray detector 902 includes a USB (universal serial bus) port 904. The USB port 904 is mounted on the housing 502 and operably coupled to the control electronics 802. The USB port 904 is operable to communicate data between the control electronics 802 and an external USB device that can be coupled to the USB port 904. In some embodiments, the USB port is a "type-A" interface.

Figure 10:
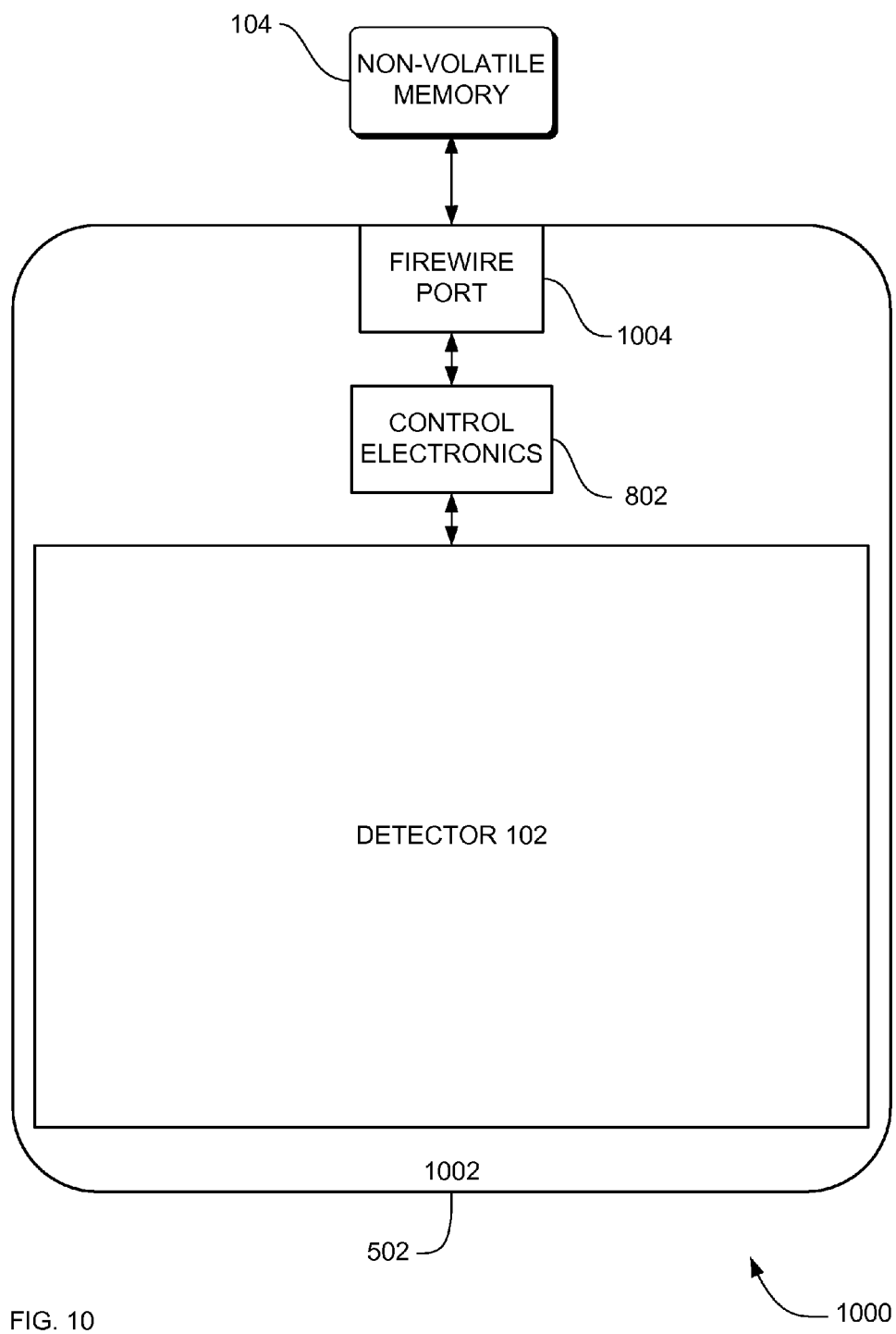
FIG. 10 is a block diagram of apparatus to capture medical images, including a Firewire port according to an embodiment.

FIG. 10 is a block diagram of apparatus 1000 to capture medical images, including a Firewire port according to an embodiment. Apparatus 1000 solves the need in the art to reduce the risk of exposing a medical patient to additional radiation and the additional cost in retaking an exposure after failure of power supply to a device that captures medical images before the device that captures medical images has completely transmitted the image data to an external device.

In apparatus 1000, a portable X-ray detector 1002 includes an external connection point device that is a FireWire (I.E.E.E. 1394) port 1004. The FireWire port 1004 is mounted on the housing and operably coupled to the control electronics 802. The FireWire port 1004 is operable to communicate data between the control electronics 802 and an external FireWire device that can be coupled to the FireWire port 1004.

Figure 11:
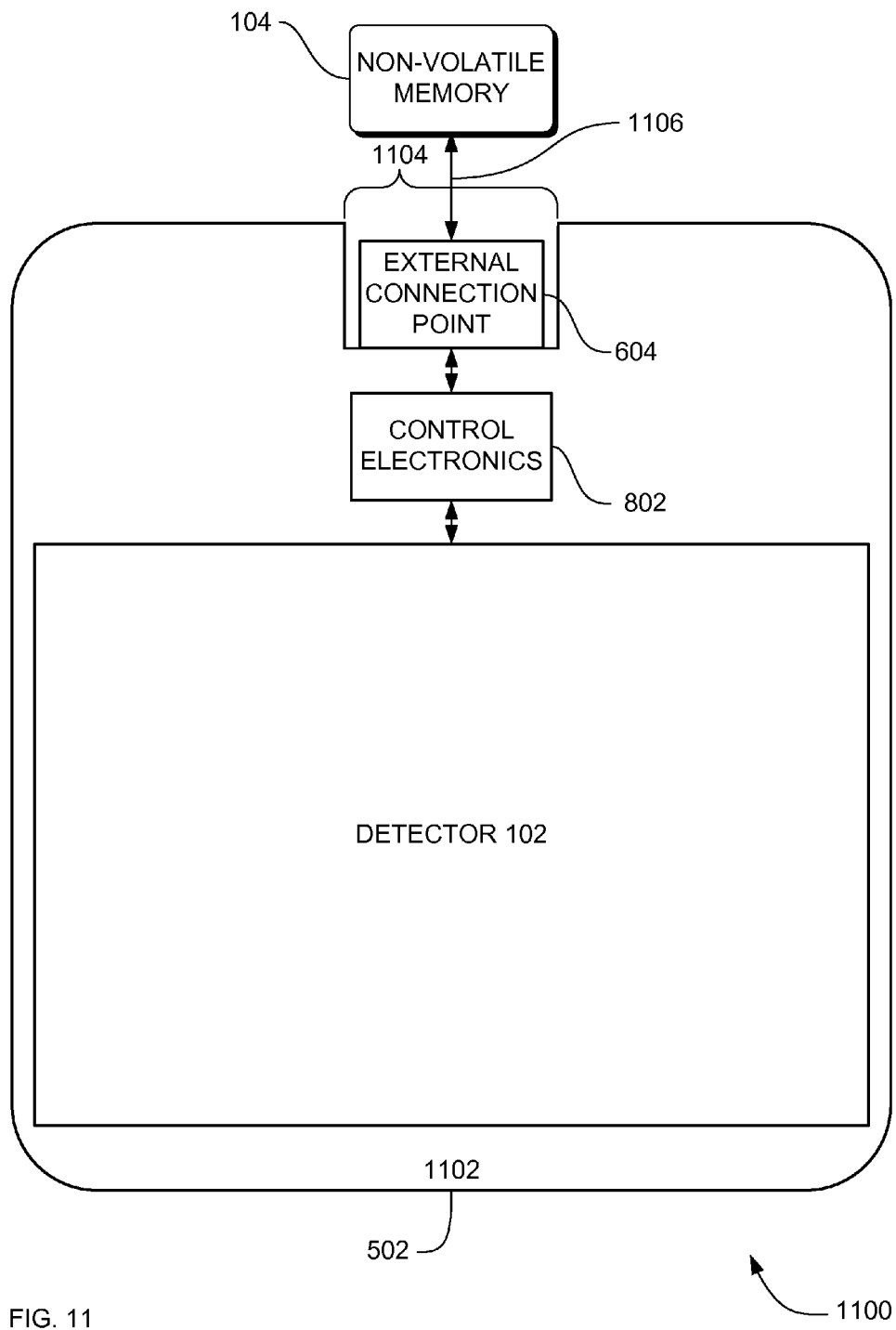
FIG. 11 is a block diagram of apparatus to capture medical images, in which the external connection point is mounted on a recessed portion of the housing, according to an embodiment.

FIG. 11 is a block diagram of apparatus 1100 to capture medical images, in which the external connection point is mounted on a recessed portion of the housing, according to an embodiment. Apparatus 1100 solves the need in the art to reduce the risk of exposing a medical patient to additional radiation and the additional cost in retaking an exposure after failure of power supply to a device that captures medical images before the device that captures medical images has completely transmitted the image data to an external device.

In apparatus 1100, a portable X-ray detector 1102 includes a housing 502 includes a recessed portion 1104. In addition, the external connection point 604 is mounted in a recessed portion 1104 of the housing 502. The external connection point 604 is operably coupled to the control electronics 802 and operable to communicate data between an external device having non-volatile memory 104 that can be operably coupled to the external connection point.

The external connection point 604 mounted in the recessed portion 1104 of the housing 502 provides that of at least some portion of the external device, a connector 1106 to the external device is protected from blunt force on the external device. In an example where the external device is a USB thumb drive, the depth of the recessed portion 1104 is at least as great as the depth of the USB thumb drive. In that example, any object moving along and in relation to the side of the housing 502 will not very easily, if at all, collide with any portion of the USB thumb drive, in which case the USB thumb drive is protected from blunt force of the moving object.

Figure 12:
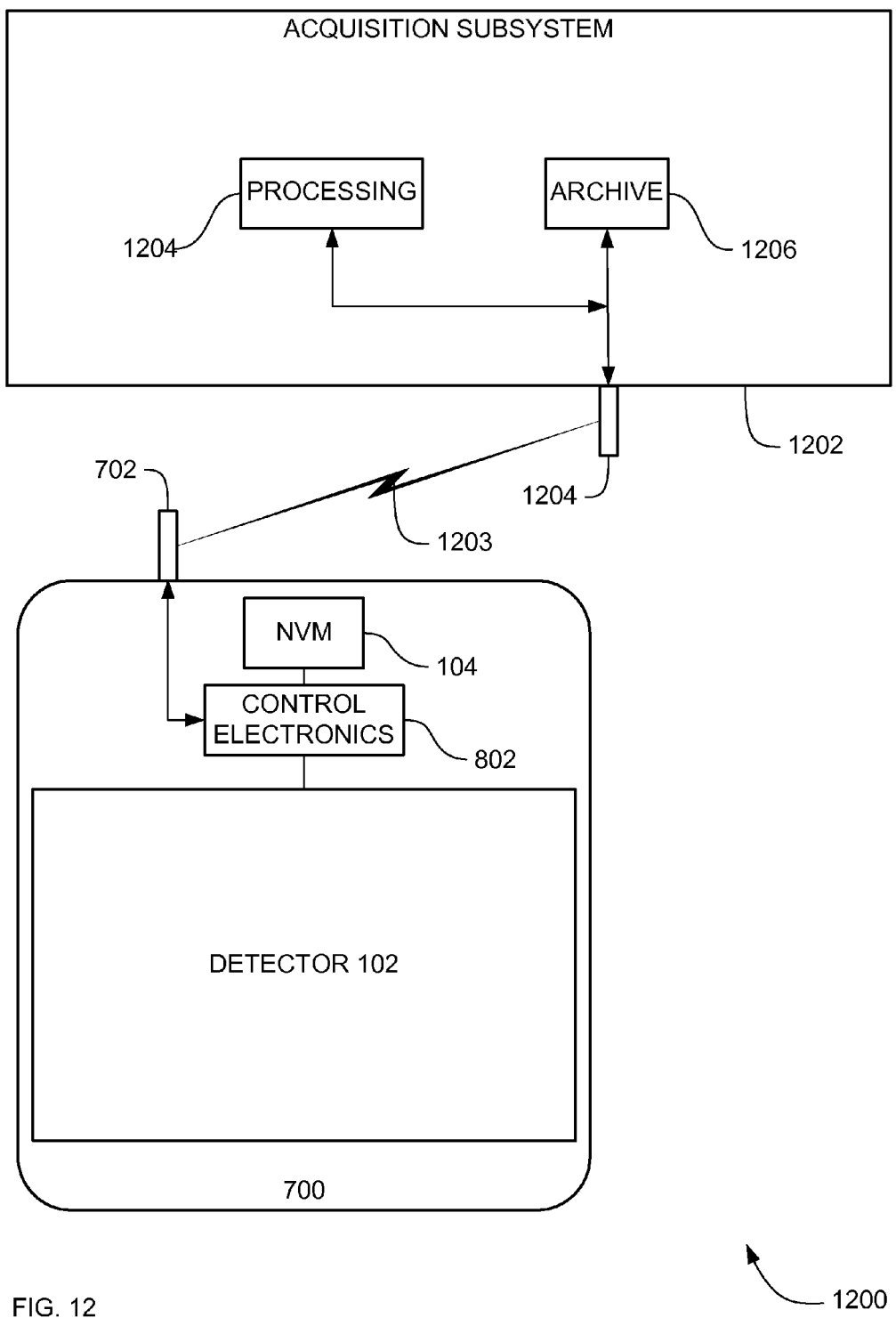
FIG. 12 is a block diagram of a wireless X-ray system having a non-volatile storage device, according to an embodiment.

FIG. 12 is a block diagram of a wireless X-ray system 1200 having a non-volatile storage device, according to an embodiment. Wireless X-ray system 1200 solves the need in the art to reduce the risk of exposing a medical patient to additional radiation and the additional cost in retaking an exposure after failure of power supply to a device that captures medical images before the device that captures medical images has completely transmitted the image data to an external device.

The wireless X-ray system 1200 includes a wireless portable X-ray detector 700 and one or more external devices, such as an acquisition subsystem 1202. The wireless portable X-ray detector 700 includes an antennae 702 that is used for communication with the acquisition subsystem 1202, via a wireless communication path 1203. The wireless portable X-ray detector 700 also includes non-volatile memory 104 and control electronics 802.

The acquisition subsystem 1202 includes an antennae 1204 that is used for communication with the wireless portable X-ray detector 700, via the wireless communication path 1203. Some embodiments of the acquisition subsystem 1202 include a processing module 1204 and an archive module 1206. The processing module 1204 performs imaging processing operations on the image data received from the wireless portable X-ray detector 700. The archive module 1206 manages a database of images.

Figure 13:
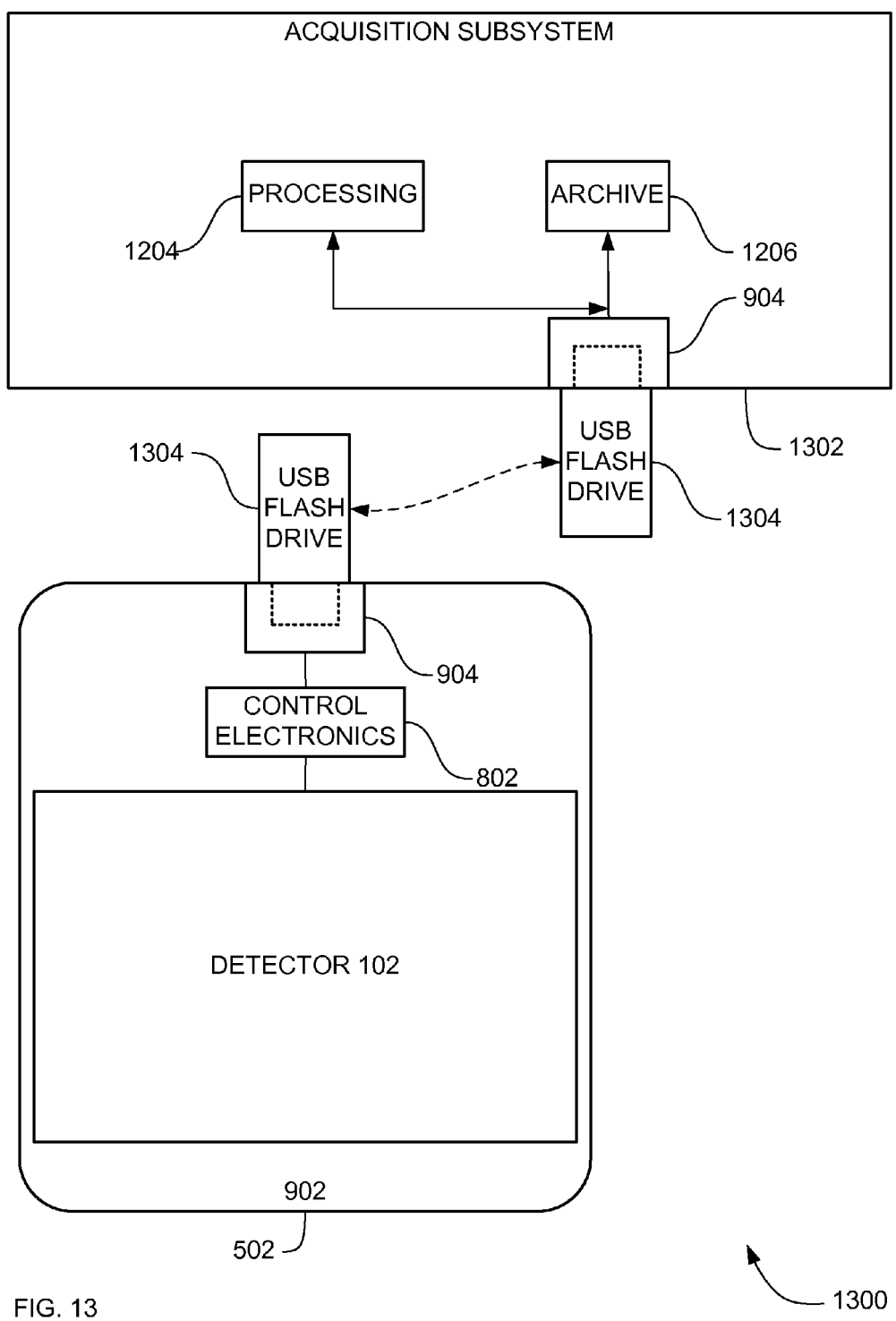
FIG. 13 is a block diagram of an X-ray system having a non-volatile storage device and USB flash drives, according to an embodiment.

FIG. 13 is a block diagram of an X-ray system 1300 having a non-volatile storage device and USB flash drives, according to an embodiment. X-ray system 1300 solves the need in the art to reduce the risk of exposing a medical patient to additional radiation and the additional cost in retaking an exposure after failure of power supply to a device that captures medical images before the device that captures medical images has completely transmitted the image data to an external device.

The X-ray system 1300 includes a portable X-ray detector 902 and one or more external devices, such as an acquisition subsystem 1302. The portable X-ray detector 902 includes a USB port 904 that is mounted on the housing and operably coupled to control electronics 802. The USB port 904 is operable to communicate data between the control electronics 802 and an external USB flash drive 1304 that can be coupled to the USB port 904. In some embodiments, the USB port is a "type-A" interface.

The acquisition subsystem 1302 includes a USB port 904. Some embodiments of the acquisition subsystem 1202 include a processing module 1204 and an archive module 1206. The processing module 1204 performs imaging processing operations on the image data received from the portable X-ray detector. The archive module 1206 manages a database of images.

X-ray system 1300 provides that a portable X-ray detector having no wired connection to external devices during positioning of the detector and during medical imaging procedures does not use or require any wireless bandwidth of the medical facility within which the X-ray system 1300 is located. The cost of one or two relatively inexpensive USB flash drive(s) 1304 provides a means by which throughput can be maximized, under circumstance in which a USB flash drive 1304 can be read and erased by the acquisition subsystem 1302 while the second was being filled with data by the detector. Furthermore, because the USB flash drive 1304 (and the supporting hardware and software) are driven by the consumer market at much higher volumes than what is experienced in the medical imaging market, owners of the medical facilities enjoy cost savings for the acquisition subsystem 1302 as well. In fact, one acquisition subsystem 1302 can service many detectors, in which case the detectors continue to be used for imaging even if the acquisition subsystem 1302 were to fail, as long as there was sufficient image storage capacity available and not used to store other images in the USB flash drive 1304 to finish the exam (or exams). This might be especially appealing to the most cost conscious medical facilities that need portability and accept the reduced throughput.

In order for detectors that have only a USB flash drive 1304 as an interface to external devices to function in synchronization with an X-ray source, some embodiments of the detectors include an X-ray sensor mechanism to determine when the detector is been exposed to X-rays, so that the detector can then "read" itself and store the X-ray image in the USB flash drive 1304. Similarly, a detector with such sophistication can also store an offset image, if that were necessary for offset correction.

In X-ray system 1300, a USB cable (not shown) can be connected between detector 902 and the acquisition subsystem 1302 for imaging applications that require higher throughput but also have a distance between the detector and the acquisition subsystem 1302 that is within reach of USB cable. Some embodiments of the detector and the acquisition subsystem 1302 support either a wired or a wireless architecture. In further embodiments, conventional wireless USB adapters are attached to the detector and the acquisition subsystem 1302 at their respective USB connection points 904. These further embodiments, provide that a medical facility might use both a "USB enabled" detector and a "USB enabled" acquisition subsystem 1302 and use either of the wired or wireless communication paths depending upon current circumstances.

Method Embodiments

In the previous section, apparatus of the operation of embodiments were described. In this section, particular methods of such embodiments are described by reference to a series of flowcharts.

Figure 14:
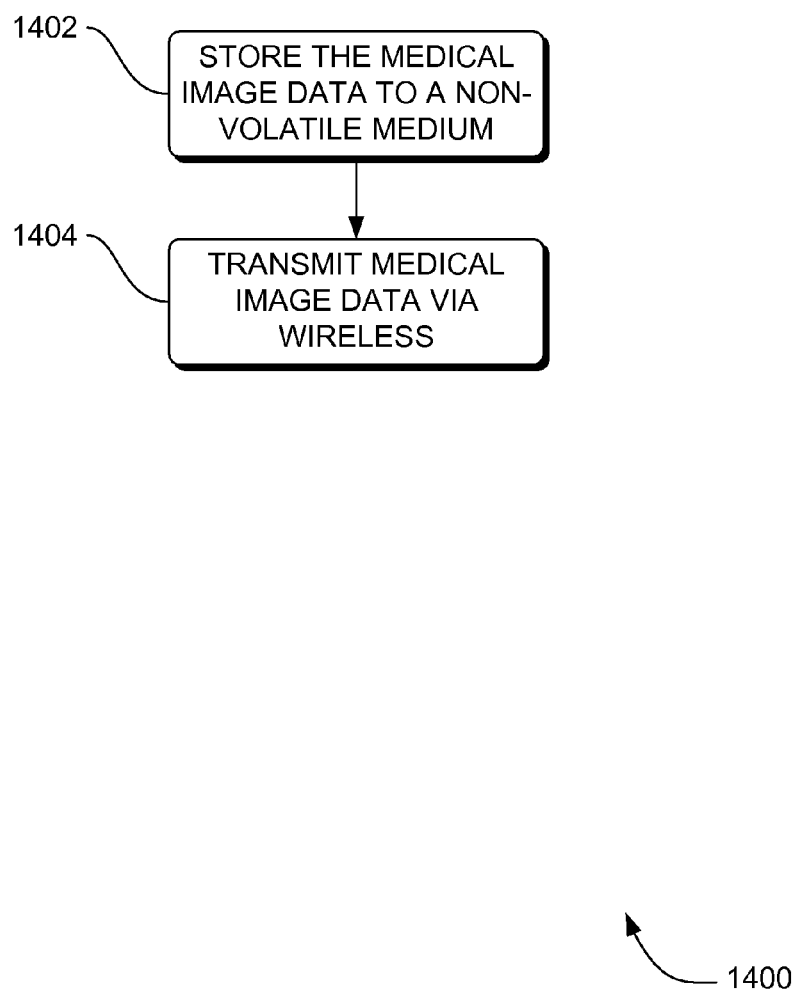
FIG. 14 is a flowchart of a method to store medical image data, according to an embodiment.

FIG. 14 is a flowchart of a method 1400 to store medical image data, according to an embodiment. Method 1400 solves the need in the art to reduce the risk of exposing a medical patient to additional radiation and solves the need in the art to reduce the risk of additional cost in retaking an exposure after failure of power supply to a device that captures medical images before the device that captures medical images has completely transmitted the image data to an external device.

Method 1400 includes storing 1402 the medical image data to a non-volatile medium 104. Method 1400 also includes transmitting 1404 the medical image data via a wireless communication path 1203.

Figure 15:
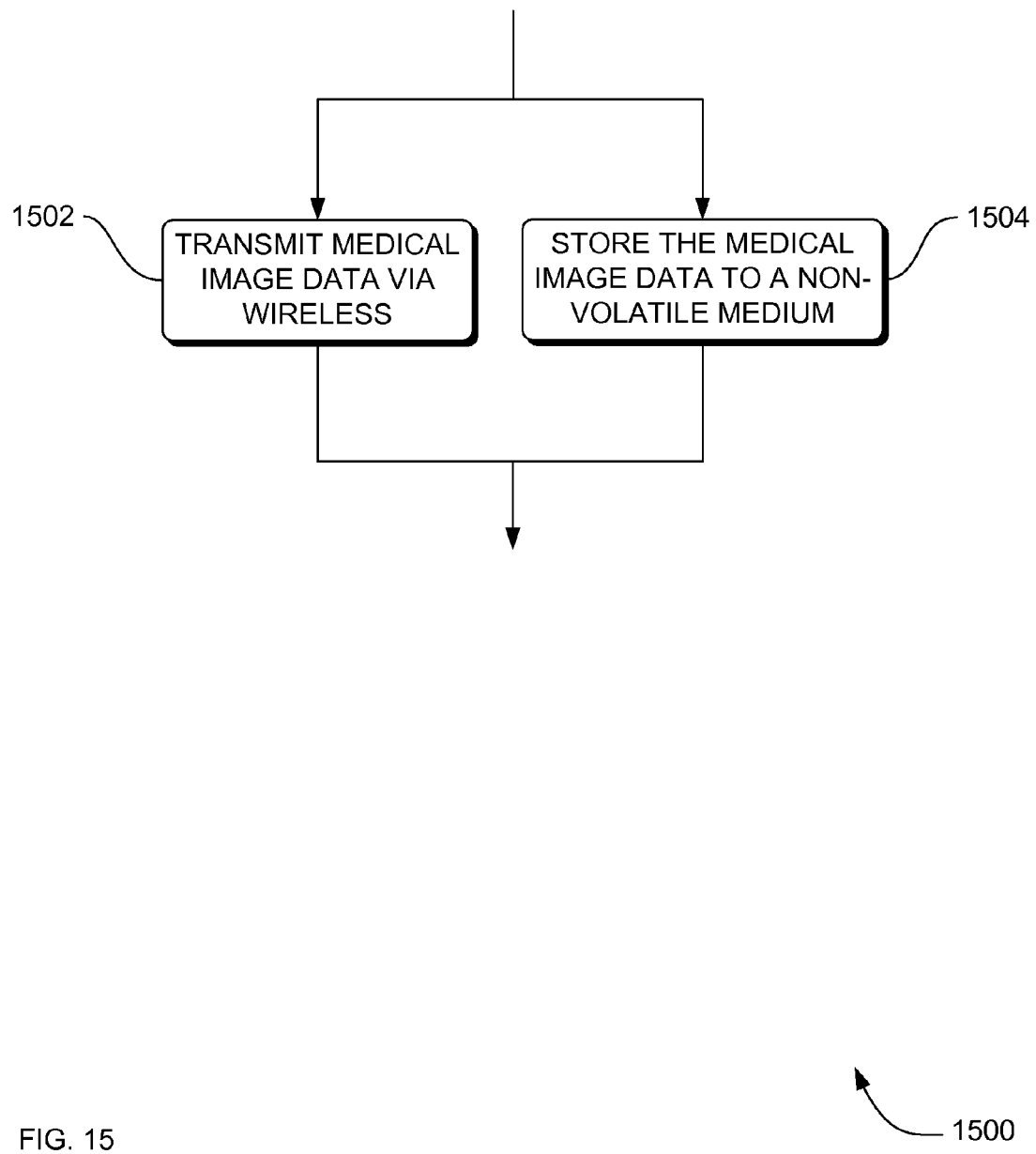
FIG. 15 is a flowchart of a method to store medical image data, according to an embodiment.

FIG. 15 is a flowchart of a method 1500 to store medical image data, according to an embodiment. Method 1500 solves the need in the art to reduce the risk of exposing a medical patient to additional radiation and the additional cost in retaking an exposure after failure of power supply to a device that captures medical images before the device that captures medical images has completely transmitted the image data to an external device.

Method 1500 includes transmitting 1502 the medical image data via a wireless communication path 1203, while simultaneously storing 1504 the medical image data to a non-volatile medium 104 that is mounted or attached to the portable X-ray detector, such as in FIGS. 5-13.

In some embodiments, methods 1400-1500 are implemented as a computer data signal embodied in a carrier wave, that represents a sequence of instructions which, when executed by a computer, processor, or microprocessor cause the computer, processor, or microprocessor to perform the respective method. In varying embodiments, the medium is a magnetic medium, an electronic medium, or an optical medium.

Figure 16:
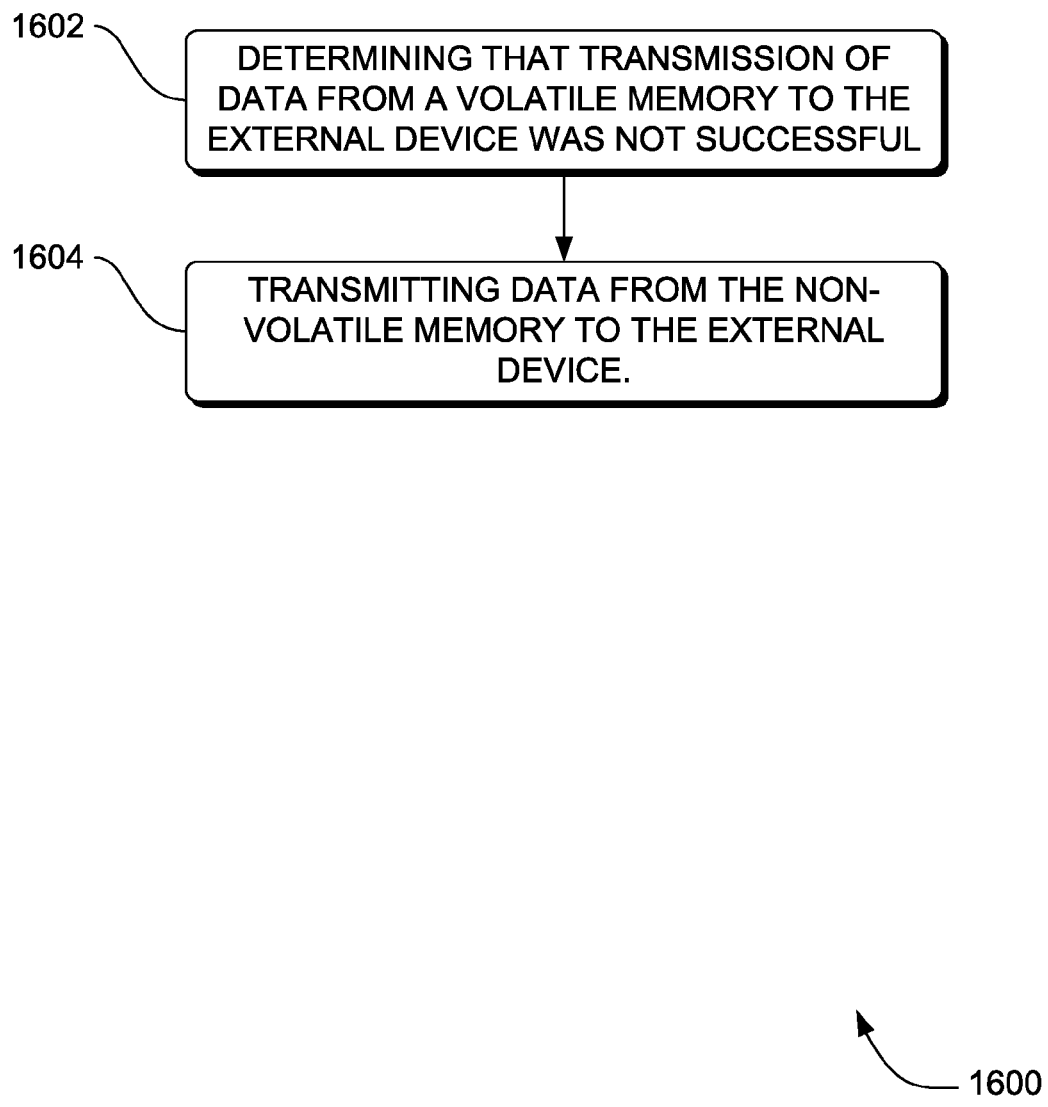
FIG. 16 is a flowchart of a method to store medical image data, according to an embodiment.

FIG. 16 is a flowchart of a method 1600 to store medical image data, according to an embodiment. Method 1600 includes determining that transmission of data from a volatile memory to the external device was not successful, at block 1602, and method 1600 includes transmitting data from the non-volatile memory to the external device, at block 1604.

Apparatus components and methods can be embodied as computer hardware circuitry or as a computer-readable program, or a combination of both. More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI).

CONCLUSION

A portable imaging device with access to non-volatile storage is described. Although specific embodiments are illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in object-oriented architecture or any other architecture that provides the required function.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future medical image acquisition devices and forms of volatile storage.

The terminology used in this application is meant to include storage, medical imaging environments and alternate technologies which provide the same functionality as described herein

We claim:

1. An apparatus to capture medical images, the apparatus comprising:

a housing;

control electronics mounted in the housing;

a digital image detector mounted in the housing and operably coupled to the control electronics;

a volatile storage device operably coupled to the control electronics and mounted in the housing, an external connection interface mounted on the housing and operably coupled to the control electronics and operable to communicate data to an external device; and a non-volatile storage device operably coupled to the control electronics and mounted in the housing, wherein the control electronics further includes executable instructions to determine that transmission of data from the volatile storage device to the external device was not successful and to subsequently transmit data from the non-volatile storage device to the external device.

2. The apparatus of claim 1, wherein the non-volatile storage device further comprises:

a non-volatile memory device.

3. The apparatus of claim 1, wherein the non-volatile storage device further comprises:

a flash memory device.

4. The apparatus of claim 1, wherein the non-volatile storage device further comprises:

a USB flash drive.

5. The apparatus of claim 1, wherein the non-volatile storage device operably coupled to the control electronics further comprises:

a non-volatile storage device removeably and operably coupled to the control electronics.

6. The apparatus of claim 1, wherein the non-volatile storage device that is removeably and operably coupled to the control electronics further comprises:

a non-volatile storage device that is removeably and operably coupled to the control electronics through a USB port.

7. The apparatus of claim 6, wherein the USB port further comprises:
a USB port mounted on a recessed portion of a housing of the apparatus.

8. The apparatus of claim 1, wherein the non-volatile storage device further comprises:
a non-volatile storage device permanently and operably coupled to the control electronics.

9. The apparatus of claim 1 further comprising:
a portable X-ray detector.

10. The apparatus of claim 1, wherein the external connection interface is operably coupled to the non-volatile storage device and operable to communicate data to the non-volatile storage device.

11. The apparatus of claim 1, the apparatus further comprising:
a wireless X-ray detector.

12. An apparatus to capture medical images, the apparatus comprising:
a housing;
a detector mounted in the housing;
control electronics mounted in the housing and operably coupled to the detector;
a volatile storage device operably coupled to the control electronics and mounted in the housing,
a non-volatile storage device operably coupled to the control electronics and mounted in the housing; and
an external connection point mounted on the housing and operably coupled to the control electronics and operable to communicate data to an external device,
wherein the control electronics further comprises:
a processor; and
executable instructions capable of directing the processor to determine that transmission of data from the volatile storage device to the external device was not successful and to subsequently transmit data from the non-volatile memory to the external device.

13. The apparatus of claim 12, wherein the external connection point further comprises:
a USB port being operable to communicate data to an external USB device that is operable to couple to the USB port.

14. The apparatus of claim 13, wherein the external USB device comprises a USB flash drive.

15. The apparatus of claim 13, wherein the external USB device comprises a USB wireless adapter.

16. The apparatus of claim 13, wherein the external USB device comprises an acquisition subsystem with a USB port connected via a USB cable.

17. The apparatus of claim 12, wherein the external connection point further comprises:
a port compliant with I.E.E.E. 1394 mounted on the housing and operably coupled to the control electronics, the I.E.E.E. 1394 port operable to communicate data to an external I.E.E.E. 1394 device that is operable to couple to the I.E.E.E. 1394 port.

18. The apparatus of claim 12,
wherein the external connection point further comprises:
an external connection point mounted on a portion of the housing and operably coupled to the control electronics and operable to communicate data to an external device.

19. The apparatus of claim 12, the apparatus further comprising:
a wireless X-ray detector including the detector and the external device is a non-volatile storage device.

20. A computer-accessible medium having executable instructions to store medical image data, the executable instructions capable of directing a processor to perform:
transmitting the medical image data from a volatile memory via a wireless communication path;
determining that the transmission of the medical image data from the volatile memory via the wireless communication path was not successful; and
storing the medical image data to a non-volatile computer-accessible medium.

21. The computer-accessible medium of claim 20, wherein the non-volatile computer-accessible medium further comprises:
a flash memory device.

22. The computer-accessible medium of claim 20, wherein the non-volatile computer-accessible medium further comprises:
a non-volatile memory device.

* * * * *